3,122,580
ALKALINE REDUCTION OF HYDROCARBONOXY SILANES
John W. Ryan, Midland, Mich., assignor to Dow Corning Corporation, Midland, Mich., a corporation of Michigan
No Drawing. Filed Mar. 28, 1961, Ser. No. 98,779
4 Claims. (Cl. 260—448.8)

This invention relates to a method for reduction of lower alkoxyl and phenoxyl radicals on silane silicon atoms to lower alkyl and phenyl radicals on silane silicon atoms by heating the silanes in a closed system with an alkali metal. This application is a continuation-in-part of my copending application Serial Number 51,539, filed August 24, 1960, now abandoned.

In the preparation of hydrocarbon-substituted silanes by the direct process the product is a mixture of mono-, di- and tri-hydrocarbon-substituted silanes. Since the organopolysiloxanes prepared from the di- and tri-hydrocarbon-substituted silanes are presently more commercially desirable than the organopolysiloxanes prepared from mono-hydrocarbon-substituted silanes, there has developed a need for some method of converting mono-hydrocarbon-substituted silanes to di- and tri-hydrocarbon-substituted silanes. Various methods of disproportionation, i.e. redistribution of silicon-bonded hydrocarbon radicals, have been developed. However, no other feasible type of method has been available to accomplish the desired conversion.

One of the objects of this invention is to provide a method of producing di- and tri-hydrocarbon-substituted silanes from mono-hydrocarbon-substituted and unsubstituted silanes. Another object of this invention is to provide a method of reducing silicon-bonded methoxyl and phenoxyl radicals to silicon-bonded methyl and phenyl radicals respectively. Another object of this invention is to provide a method of preparing silanes having both alkyl and phenyl radicals attached to each silicon atom from silanes having only alkyl radicals attached to each silicon atom. These objects as well as others which are apparent from the following description are satisfied by this invention.

This invention relates to the method which comprises heating at a temperature above 150° C. a mixture of (A) silanes of the formula $R_{4-m}Si(OR')_m$ in which each R is a monovalent hydrocarbon radical free of aliphatic unsaturation, each R' is a radical independently selected from the group consisting of the methyl radical and the phenyl radical and m is a positive integer ranging in value from 2 to 4 and from about 0.1 to about 20 percent by weight based on the weight of A of (B) an alkali metal whereby silanes other than A are produced having the formula $R_{4-n}Si(OR')_n$ in which R and R' are as defined above, n is a positive integer ranging in value from 1 to 3 and the average value of n is less than the average value of m.

Component A in the method of this invention consists of silanes of the general formula $R_{4-m}Si(OR')_m$ in which each R can be any monovalent hydrocarbon radical free of aliphatic unsaturation, each R' can be a methyl or phenyl radical and m can be 2, 3 or 4. More specifically, each R can be, for example, any alkyl radical such as the methyl, ethyl, isopropyl, butyl, t-butyl, 2-ethylhexyl, dodecyl, octadecyl and myricyl radicals; any cycloalkyl radical such as the cyclopentyl and cyclohexyl radicals; any aryl radical such as the cyclopentyl and cyclohexyl radicals; any aryl radical such as the phenyl, xenyl and naphthyl radicals; any aralkyl radical such as the benzyl and xylyl radicals or any alkaryl radical such as the tolyl and dimethylphenyl radicals. Examples of typical silanes which can be employed in the method of this invention include:

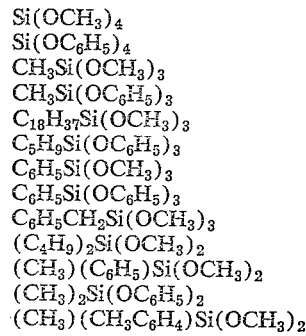

and

These examples merely illustrate the variety of silanes which can be employed in the method of this invention.

Component B in the method of this invention is any alkali metal such as sodium, potassium, lithium or cesium.

The method of this invention involves in some order mixing components A and B and heating them at a temperature of at least 150° C. The reaction temperature depends primarily on the R' radicals present in the system. Phenoxyl radicals can be reduced to phenyl radicals at temperatures of at least 150° C., preferably in the range of 220° C. to 300° C. Methoxyl radicals can be reduced to methyl radicals only by heating to temperatures greater than 200° C., preferably from about 230° C. to about 270° C. There is no critical maximum temperature except the decomposition temperature of the R radicals, —OR' radicals or compounds in the system. Although this method is operative in the vapor state, it is preferable to operate in a liquid state. This can be done by using a closed system when temperatures above the boiling point of any reactant are employed and by staying below critical temperatures, e.g. 282° C. for methyltrimethoxysilane.

The ratio of B to A can vary a great deal due to the relative activities of the various alkali metals. However, more than about 20 percent by weight of B based on the weight of A is unnecessary although the presence of excess B is not detrimental generally depending on time and temperature conditions. Likewise as little as about 0.1 percent by weight of B based on the weight of A can be used under proper conditions of time and temperature. However, at least 1.0 percent by weight of B based on the weight of A is preferred.

The time of heating in the method of this invention depends on the temperature, the composition of component A, the amount and activity of B, the desired products and the desired yield. For example, the method of this invention produces from monomethyltrimethoxysilane some dimethyldimethoxysilane in less than an hour at 270° C. with 2.5 percent by weight of sodium based on the weight of the monomethyltrimethoxysilane. On the other hand this method can operate over 100 hours with 1.0 percent by weight of lithium producing both dimethyldimethoxysilane and trimethylmethoxysilane. Since in the reduction of the methoxyl radicals the alkali metal is consumed in the formation of various basic compounds such as alkali metal methoxides, oxides and silanolates, there is also a general migration of methyl radicals as well as any ethyl and phenyl radicals from one silicon atom to another as described in my copending application Serial No. 98,778 entitled "Alkaline Rearrangement of Hydrocarbon-Substituted Silanes" filed concurrently herewith. However, this migration of radicals does not interfere apparently with the reduction reaction.

The method of this invention produces products different from the reactants and having the general formula $R_{4-n}Si(OR')_n$ in which R and R' are as defined above and $n$ is 1, 2 or 3. The average value of $n$ is less than the average value of $m$ in the starting material $R_{4-m}Si(OR')_m$ since some —OR' radicals are removed from the system by reduction. In specific cases methyltrimethoxysilane produces dimethyldimethoxysilane and trimethylmethoxysilane, i.e. silanes of the formula $(CH_3)_rSi(OCH_3)_{4-r}$ in which $r$ can be 2 or 3, or methyltriphenoxysilane produces methylphenyldiphenoxysilane or methyldiphenylphenoxysilane, i.e. silanes of the formula $$(CH_3)(C_6H_5)_sSi(OC_6H_5)_{3-s}$$

in which $s$ can be 1 or 2.

The following examples show some of the possible variations in time, temperature, silanes, alkali metals, proportions and products. These examples are merely illustrative and are not intended to limit this invention the scope of which is properly delineated in the claims. The symbols Me and Ph represent the methyl and phenyl radicals respectively. All quantitative measurements are in parts by weight.

EXAMPLE 1

In each of the following runs 100 parts by weight of methyltrimethoxysilane were mixed with the amount of alkali metal compound shown in an autoclave which was sealed and heated at the temperature and for the time shown. The liquid portion of the reaction product was distilled to separate trimethylmethoxysilane (B.P. 55.5° C.), dimethyldimethoxysilane (B.P. 80.2° C.), methyltrimethoxy-silane (B.P. 102° C.) and dimethylether (B.P. —21.6° C.).

The results were as follows:

*Table*

| Component B | Wt. Percent Based on A | Temp. (° C.) | Time (hr.) | Mol Percent of Me in A present in product as— | | |
|---|---|---|---|---|---|---|
| | | | | Me₃SiOMe | Me₂Si(OMe)₂ | MeSi(OMe)₃ |
| Na | 12.9 | 230 | 16 | 47 | 36 | 19 |
| Na | 2.5 | 250 | 6.0 | 7 | 34 | 55 |
| Na | 2.6 | 240 | 87 | 6 | 40 | 45 |
| K | 1.7 | 250 | 15 | 2 | 36 | 58 |
| Na | 6.8 | 270 | 4.3 | 16 | 49 | 26 |
| Li | 2.0 | 270 | 23 | 4 | 6 | 81 |
| Na | 3.5 | 270 | 22 | 6 | 38 | 46 |

EXAMPLE 2

491 parts of $Me_2Si(OPh)_2$ and 35 parts of sodium were mixed and heated in a closed system for 16 hours at 275 to 277° C. A liquid product resulted containing as one component $PhMe_2SiOPh$.

EXAMPLE 3

400 parts of $Si(OMe)_4$ and 53 parts of sodium were mixed and heated 2 hours at 220° C. and 18 hours at 230° C. in a closed system. The products included $Me_2Si(OMe)_2$ and $MeSi(OMe)_3$.

EXAMPLE 4

400 parts of n-propyltrimethoxysilane and 28.5 parts of sodium were mixed and heated in a closed system for 20 hours at 278° C. The products included $$C_3H_7)Me_2SiOMe$$

$C_3H_7)MeSi(OMe)_2$ and $(C_3H_7)_2Si(OMe)_2$.

EXAMPLE 5

When 100 parts of $MeSi(OPh)_3$ and 10 parts of sodium are mixed and heated in a closed system for 16 hours at 270° C. and the resulting liquid is cooled and distilled, $MePhSi(OPh)_2$ and $MePh_2SiOPh$ are produced.

EXAMPLE 6

When the following silanes are substituted for the $Si(OMe)_4$ in Example 3, the following compounds are produced.

| Silanes | Products |
|---|---|
| $C_{18}H_{37}Si(OMe)_3$ | $(C_{18}H_{37})MeSi(OMe)_2$ |
| $C_8H_{17}Si(OMe)_3$ | $(C_8H_{17})MeSi(OMe)_2$ |
| $C_6H_{11}Si(OMe)_3$ | $(C_6H_{11})MeSi(OMe)_2$ |
| $C_6H_5Si(OMe)_3$ | $(C_6H_5)MeSi(OMe)_2$ |
| $CH_3C_6H_4Si(OMe)_3$ | $(CH_3C_6H_4)MeSi(OMe)_2$ |

That which is claimed is:

1. The method which consists in heating at a temperature above 150° C. a mixture of (A) silanes of the formula $R_{4-m}Si(OR')_m$ in which each R is a monovalent hydrocarbon radical free of aliphatic unsaturation, each R' is a radical independently selected from the group consisting of the methyl radical and the phenyl radical and $m$ is a positive integer ranging in value from 2 to 4 and from about 0.1 to about 20 percent by weight based on the weight of A of (B) an alkali metal whereby silanes other than A are produced having the formula $$R_{4-n}Si(OR')_n$$

in which R and R' are as defined above, $n$ is a positive integer ranging in value from 1 to 3 and the average value of $n$ is less than the average value of $m$.

2. The method which consists in heating in a closed system at a temperature above 200° C. a mixture of (A) methyltrimethoxysilane with from about 0.1 to about 20 percent by weight based on the weight of A of (B) an alkali metal whereby silanes are produced having the formula $(CH_3)_rSi(OCH_3)_{4-r}$ in which $r$ is a positive integer ranging in value from 2 to 3.

3. The method of claim 2 wherein the heating temperature ranges from about 230° C. to about 270° C.

4. The method which comprises heating at a temperature above 220° C. a mixture of (A) methyltriphenoxysilane with from about 0.1 to about 20 percent by weight based on the weight of A of (B) an alkali metal whereby silanes are produced having the formula $$(CH_3)(C_6H_5)_sSi(OC_6H_5)_{3-s}$$

in which $s$ is a positive integer ranging in value from 1 to 2.

References Cited in the file of this patent

UNITED STATES PATENTS 2,474,444    Taylor            June 28, 1949